United States Patent [19]

Naiman et al.

[11] Patent Number: 4,553,980

[45] Date of Patent: Nov. 19, 1985

[54] ESTER-CONTAINING HALOPOLYALKYLENES

[75] Inventors: Michael I. Naiman, St. Louis; John A. Schield, Chesterfield, both of Mo.

[73] Assignee: Petrolite Corporation, Saint Louis, Mo.

[21] Appl. No.: 725,612

[22] Filed: Apr. 22, 1985

Related U.S. Application Data

[63] Continuation of Ser. No. 626,830, Jul. 2, 1984, and a continuation-in-part of Ser. No. 432,494, Oct. 4, 1982, abandoned, which is a continuation-in-part of Ser. No. 356,994, Mar. 11, 1982, Pat. No. 4,471,098.

[51] Int. Cl.$^4$ ............................................... C10L 1/18
[52] U.S. Cl. ............................................ 44/62; 44/70
[58] Field of Search ...................... 44/62, 70; 525/386, 525/356

[56] References Cited

U.S. PATENT DOCUMENTS

| | | | |
|---|---|---|---|
| 3,981,850 | 9/1976 | Wisotsky et al. | 526/227 |
| 4,036,772 | 7/1977 | Dorer, Jr. | 525/168 |
| 4,161,452 | 7/1979 | Stambaugh et al. | 525/285 |

*Primary Examiner*—Mrs. Y. Harris-Smith
*Attorney, Agent, or Firm*—Robert E. Wexler

[57] ABSTRACT

This invention relates to polyalkylenes which contain both halogen and ester groups, to the preparation thereof, and to the use thereof as pour depressants for fuel oils. This invention also relates to polyalkylene esters.

1 Claim, No Drawings

ESTER-CONTAINING HALOPOLYALKYLENES

This is a continuation of application Ser. No. 626,830, filed July 2, 1984.

This invention relates to halogenated polyalkylenes whose halogens have been wholly or partially replaced by ester groups and to the use thereof as cold flow pour depressants in middle distillate fuels.

In storage and use of heavy oils, such as lubricating oils, problems associated with pour point have long been in existence and have been recognized in the art. The pour point of an oil is defined as the lowest temperature at which the oil will pour or flow when chilled without disturbance under specified conditions. In the past, it has been discovered that pour-point problems also exist in the storage and use of distillate fuel oils, particularly at low temperatures. Pour-point problems arise through the formation of solid or semi-solid waxy particles within an oil composition. For example, in the storage of furnace oils or diesel oils during the winter months temperatures may decrease to a point as low as $-26°$ to $-40°$ C. The decreased temperatures often cause crystallization and solidification of wax in the distillate fuel oil.

Chlorinated polyethylenes and ethylene vinyl ester type copolymers have been employed as cold flow improvers for hydrocarbon fuels.

The following patent illustrates chlorinated polyethylenes used as cold flow improvers:

U.S. Pat. No. 3,337,313.

The following patents illustrate ethylene-vinyl-ester-type copolymers used as cold flow improvers: U.S. Pat. No. 3,048,479, U.S. Pat. No. 3,093,623, U.S. Pat. No. 3,131,168.

Often both types do not function equally in the same fuel. One type may be effective in one type of fuel while the other may be effective in another type of fuel.

We have now discovered ester-containing halopolyalkylenes prepared by replacing the halo groups of the halopolyalkylenes with ester groups.

We have now discovered that these ester-containing halopolyalkylenes are often effective as pour depressants or improve cold flow in those fuels where the original halopolyalkylenes are not. Thus, the compositions of this invention broaden the effectiveness of halopolyalkylenes in such fuel.

The starting compositions of this invention are oil soluble chlorine-containing low molecular weight polyethylenes which are essentially free of crosslinking and preferably have a chlorine content of not more than about 35% by weight. Polyethylenes include polyethylenes and copolymers of ethylene with mono-olefinic hydrocarbons having, for example, 3–20 carbon atoms. The copolymers preferably have at least 50 mole percent ethylene.

The starting chlorine-containing polymers of this invention are advantageously prepared from non-chlorinated ethylene polymers of low molecular weight but have an average molecular weight of at least about 1,000. They advantageously have average molecular weights in the range of about 1,000–12,000 and preferably, for the purposes of this invention, about 1,000–7,000. They are chlorinated to a chlorine content of not more than about 35% by weight, and the resulting chlorine-containing polymers therefore have average molecular weights of about 1,000–16,000 and preferably about 1,000–9,500.

Too high an average molecular weight in the polymer may adversely affect its solubility in the fuel oil. Therefore, polymers with very high molecular weights, such as those from a Ziegler process, are not considered suitable for use in this invention in fuel oil.

The average molecular weights of the above polymers may conveniently be determined by means of an ebulioscope or an osmometer. Another method is by means of the intrinsic viscosity of the polymer (D-1601-59-T in decalin solvent at 135° C.).

As stated above, the ethylene polymer includes both polyethylene and copolymers of ethylene with mono-olefinic hydrocarbons having 3–20 carbon atoms with the copolymer having at least 50 mole percent ethylene. Advantageously, the polyethylene (prior to chlorination) has a branch index (number of substituent groups per 100 carbon atoms) of not more than about 5. Advantageously, the copolymer is one of ethylene with propylene having (prior to chlorination) a branch index of at least about 6 and preferably about 6–20. A very advantageous polyethylene is one having a branch index of about 2–3 and a molecular weight of about 2,000. A very advantageous copolymer of ethylene and propylene is one having a branch index of about 10–14 and an average molecular weight of about 1,800.

When the ethylene polymers are chlorinated, naturally ally the branch index is increased. However, in identifying the chlorine-containing polymer it has been found more convenient to describe the chlorine content of the new polymer in terms of weight percent.

For purposes of this invention, the ethylene polymers described herein have little, if any, crosslinking; although, as described above, they include branched polymers.

These polymers may be described as being essentially free of crosslinking.

The chlorine-containing ethylene polymers usable in accordance with this invention are oil soluble. Generally, this means that they are completely soluble in distillate fuel oils in concentrations of at least about 10% by weight (slight haze is permissable) at room temperature (25° C.).

However, it is not always necessary that the nonchlorinated polymers possess good oil solubility. To illustrate, a polyethylene having a lower order of oil solubility, a crystallinity of about 60–70, a branch index of about 2–3, and an average molecular weight of about 2,000 has been chlorinated to produce a chlorine-containing polymer having good oil solubility, together with exceptional pour-point depressant properties.

Suitable polyethylene for chlorination are advantageously products or by-products from the peroxide catalyzed polymerization of ethylene. Polymerization reactions using peroxide catalysts are well known in the art and any of these may, for example, be used to produce the desired pour-point depressor of this invention. The low molecular weight polyethylene by-products are usually oily liquid hydrocarbon mixtures, hydrocarbon greases, or hydrocarbon waxes obtained in small quantities in the mass polymerization of ethylene at elevated temperatures and pressures using a free radical polymerization catalyst, and such by-products from polymerization catalyzed by the presence of peroxides (or oxygen which forms peroxides) are particularly suitable. Another example of a product which may be used is the homopolymer by-product described by J. W. Ragsdale, U.S. Pat. No. 2,863,850 patented Dec. 9, 1958. Other such products are well known in the art.

The above-defined copolymer of ethylene with a monoolefinic hydrocarbon having from about 3–20 carbon atoms has at least about 50 mole percent ethylene. The mono-olefinic hydrocarbon includes propylene, butylenes, pentylenes, hexylenes, and up to 20 carbons, and mixtures thereof. Preferably, the mono-olefinic hydrocarbon is propylene. The copolymers are prepared by methods known in the art. Advantageously, the copolymer of ethylene with propylene is prepared by subjecting the combination to polymerization by peroxide catalyst, or a tetraphenyl tin-aluminum chloride-vanadium tetrachloride catalyst system or a tetra-alkyl lead-vanadium tetrachloride catalyst system.

Usable polymers for chlorination in accordance herewith may also be obtained by extraction of low molecular weight polymers having branch indexes hereinbefore defined. Extraction may be accomplished using a solvent or a solventantisolvent. The extracted polymer is usable if it falls within the definition of the polymers of this invention as to characteristics. Such extracted fraction usually has a higher branch index and a lower intrinsic viscosity than the starting material, as well as a higher concentration of total solubility in distillate fuels and a lower crystallinity. Examples of suitable solvents are the low molecular weight hydrocarbons such as butane, pentane, hexane, heptane, etc., and examples of antisolvents, usable therewith, are the low molecular weight alcohols such as methanol, ethyl alcohol, isopropyl alcohol, n-butanol, etc. Naphtha is a particularly advantageous solvent because it does not require the use of an antisolvent. However, because polymers having the desired characteristics are available commercially and because such polymers can be "tailor-made" to have the desired characteristics, it is particularly preferred to use such polymers which do not need prior extraction. Extraction adds an expensive step to preparation of the polymers.

Such polymers for chlorination as described above are well known in the art and are readily available commercially. Many of the usable polymers for chlorination are obtained as by-products from commercial polymerization processes as undesirable low molecular weight materials and because of their availability and economic attractiveness such by-product polymers are advantageous for use herein.

The chlorination of these polymers produces chlorine substitutents on the polymer chain. These chlorine substituents increase the pour-point depressant properties of the polymer. A preferred method of preparing the chlorine-containing ethylene polymer of this invention (and thereby adding the chlorine substitutents on the polymer chain) is carried out by treating the above-defined ethylene polymer with chlorine under suitable reaction conditions to produce the chlorinated ethylene polymer. This process is carried out until the desired chlorine content of the resulting polymer is reached. Usually this content is not more than about 35% by weight of the polymer. Increased amounts of chlorine tend to lessen the pour-point properties of the polymer and therefore are not preferred.

The chlorination may be carried out by one of several procedures. In one process, chlorine is bubbled through the molten polymer usually under temperature conditions of at least about 65.5° C. and advantageously between 65° and 205° C. A second process is carried out by bubbling chlorine through the polymer suspended in an inert solvent, such as carbon tetrachloride (and other chlorinated methanes, ethanes, and the like) under temperature conditions of at least 24° C. The rate of reaction may be accelerated by using an actinis light source. A third process is carried out by bubbling chlorine through an aqueous suspension of the polymer. The first two processes are preferred since it is believed that in their use the chlorine contacts a greater portion of the inner polymer chain. It is to be understood that the chlorine addition includes the use of known chlorinating compounds such as sulfuryl chloride, oxalyl chloride, phosgene, and the like.

It is further believed, but again not known absolutely, that the chlorination of the ethylene polymer produces the chlorine-containing polymer having the chlorine atoms with such a distribution on the polymer chain as to provide exceptional pour-point depressant properties in the polymer.

The chlorination is carried out to produce a chlorine-containing polymer having preferably less than about 35% chlorine by weight. More preferable and optimum chlorine contents are dependent somewhat on the particular polymer being chlorinated. To illustrate, a polyethylene having a branch index of not more than about 5 and a molecular weight of about 1,500–2,500 is preferably chlorinated to a chlorine content of about 10–30% by weight. More optimum pour-point depressant properties for this polymer result when it has an average molecular weight of about 2,000, a branch index of about 2–3, and a chlorine content of about 16–23% by weight. Another illustration is a copolymer of ethylene and propylene having a branch index of about 6–20, an average molecular weight of about 1,500–2,000, and a chlorine content of about 4–13% by weight. More optimum pour-point depressant properties are obtained when this polymer has a branch index of about 10–14; an average molecular weight of about 1,800, and a chlorine content of about 8–11% by weight. More exact values for these ranges are dependent on the particular fuel oil being utilized.

We have discovered that the halopolyalkylenes can be converted to ester-containing halopolyalkylenes by replacing the halo- groups with carboxyl group so as to yield ester groups

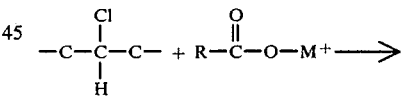

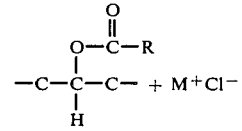

where R is a hydrocarbon group, for example alkyl, alkenyl, cycloalkyl, aryl, aralkyl, alkaryl, etc., where R has from 1 to 30 carbons.

Suitable carboxylic acids include the following: acetic, propionic, butyric, valeric, hexanoic, heptanoic, octanoic, lauric, palmitic, stearic, oleic, benzoic, substituted benzoic acid, olefinic acids.

The preferred carboxylic acids are alkanecarboxylic acids having from 1–30 carbon atoms but preferably from 1–18 carbon atoms.

In practice, the carboxylic acids are reacted in salt forms such as sodium, potassium, etc., salts.

In the compositions of this invention, at least about 1% of the halogens are replaced, such as from about 1 to 100% of the halogens replaced, for example from about 10 to 80% of the halogens replaced, but preferably from about 15 to 75%.

Where all chlorines are not removed the structure of the product is a conbination of chlorinated polyethylene and ethylene vinyl ester copolymer in the same molecule. In addition there is olefinic unsaturation due to elimination of HCl. NMR analysis gives a quantitative determination of the structure since it determines the ratio of chlorine to ester to olefin because the adjacent hydrogens to those structural groups are well separated in the NMR.

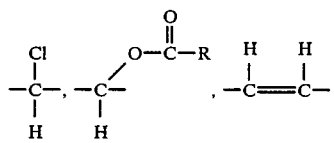

The product has a unique structure of a partially chlorinated ethylene-vinyl ester copolymer with some olefinic unsaturation in the backbone. In the case of linear polyethylene these materials differ radically from normal EVA structures because the backbone is totally linear while ethylene-vinyl ester copolymers have substantial branching.

A problem that exists is that the mild basicity of sodium carboxylates leads to a certain amount of elmination of HCl from the backbone of the polymer to form internal olefin. This reaction competes with the substitution reaction. The formation of internal olefin is known to be harmful to its cold flow activity and this side reaction must be minimized. This elimination side reaction varies depending on temperature, solvent and structure of the carboxylate anion. It is difficult to eliminate this reaction completely and as far as cold flow activity is concerned we have to make up in substitution what we lose by olefin formation. In general the ratio of substitution to elimination ranges from 3/1 to 6/1.

The conversion of chlorinated polyethylene to an ethylene-vinyl ester type copolymer is not a simple task because the sodium salts of carboxylic acids are not soluble in the common nonpolar solvents that dissolve chlorinated polyethylene. This incompatibility problem can be handled in three ways.

1. The reaction can be carried out in a nonpolar solvent in the presence of a crown ether (such as 18-crown 6) which essentially solubilizes the metal ion carboxylate in the organic medium and allows for a homogeneous reaction.

2. The reaction can also be carried out in the presence of a phase transfer catalyst system. This entails dissolving the sodium carboxylate and an oil-water soluble quaternary ammonium compound in water and conducting a two phase reaction with the chlorinated polyethylene dissolved in a nonpolar organic solvent. The reaction proceeds because the quaternary ammonium salt transfers the carboxylate anion as part of its own structure to the organic phase so that the actual reaction proceeds homogeneously.

3. The reaction can be carried out in a solvent mixture where there is partial solubility of both the chlorinated polymer and the salt of the organic acid.

The first two reaction methods are less economical because of the high cost of crown ethers and quaternary ammonium compounds. Method three is the most economically commercial.

We have found that blends of alcohols, and blends of alcohols and ketones (ethyl cellosolve/methyl isobutyl ketone, methyl carbitol/diisobutyl ketone) allow us to conduct the displacement reaction in an effective manner.

The following examples are presented for purposes of illustration and not of limitation. The chlorinated polyethylene employed herein is a chlorinated linear polyethylene having a molecular weight of about 2000 and a weight % chlorine content of about 24%.

EXAMPLE 1

A mixture of 20 gms chlorinated linear polyethylene, 24 gms of potassium acetate (0.153 mole) and 2 gms (0.00756 mole) of 18 crown-6(1,4,7,10,13,16,-hexaoxacyclooctadecane) was stirred in 30 g of Solvent 14. The total was heated at 130° C. for 24 hours. The reaction mixture was cooled slightly and filtered. Evaporation of the solvent left a waxy residue. An infrared spectrum of the residue showed strong carbonyl absorption at 1740 cm$^{-1}$. The proton NMR showed the following: (CCl$_4$ solvent, TMS internal standard) 1.24 δ (multiplet, CH$_2$)

1.96 δ (singlet,

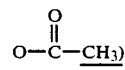

3.58 δ (singlet, crown ether CH$_2$'s)
3.82 (CHCl) 4.77 δ

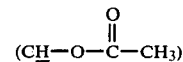

5.32 δ (olefinic CH$_2$). The following is the analytical determination of the extent of reaction by integration of the respective CH absorptions. % Cl, % ester, % Olefin=15:70:15.

EXAMPLE 2

A mixture of 20.0 g chlorinated linear polyethylene, 17.0 g (0.207 mole) of sodium acetate, 100 ml of methyl isobutyl ketone, 10 ml of water, and 2.4 g (0.0066 mole) of hexadecyltrimethylammonium bromide was stirred and heated in a stainless steel reactor at 125° C. for 3 days. The reaction mixture was then cooled and 250 ml of methanol was added and the mixture stirred for 15 minutes. The methanol portion was decanted and this washing process was repeated three times. The residue was then transferred to a 400 ml beaker and dissolved in cyclohexane and toluene by heating and stirring. The mixture was filtered and evaporation of the solvent from a sample of the filtrate left a waxy residue. The IR and NMR spectra had characteristic absorptions similar to those of the previous example and the following relative analysis was determined from the NMR spectrum: % Cl: % Ester: % Olefin=51:39:10.

EXAMPLE 3

13 gms of lauric acid was dissolved in 90 mls of butyl cellosolve and 15 mls of ethylene glycol. To this was added 3.5 gms of sodium methoxide and the mixture was heated to 120° C. until it became clear (formation of sodium laurate). 20 gms of chlorinated linear polyethylene was added and the reaction was stirred vigorously at 145° C. for 22 hours. The reaction was cooled and a large excess of methanol was added to precipitate the polymer. The polymer was washed with methanol and then redissolved in cyclohexane. NMR analysis shows the following results: % Cl: % Ester: % Olefin = 54:35:10.

EXAMPLE 4

19 gms of lauric acid was dissolved in 100 mls of methyl carbitol and 25 mls of diisobutyl ketone. To this was added 5.1 gms of sodium methoxide in order to form the sodium laurate. 20 gms of chlorinated linear polyethylene was added and the reaction was heated at 155° C. for 24 hours. The polymer was precipitated in methanol, washed and redissolved in cyclohexane. NMR analysis shows the ratio of % Cl: % Ester: % Olefin 45:43:12.

EXAMPLE 5

Using the same reaction conditions as Example 4, the following acids were used for conversion to their sodium salts and subsequent displacement of chlorines from chlorinated polyethylene:

| (a) propionic | (b) octanoic acid |
|---|---|
| (c) oleic acid | (d) stearic acid. |

The ester-containing chlorine-containing ethylene polymers of this invention are very useful for depressing pour points of fuel oils. Most hydrocarbon fuels yield crystals of solid wax as their temperature is lowered below the cloud point. In a usual distillate fuel oil composition containing a pour-point depressant addition agent, the crystals of solid wax do not hinder flow through pumps, filters, screens, etc., even at temperatures well below the pour point of the base oil, for example, distillate fuel oil. In such cases the crystals are small and therefore do not hinder flow. However, in some fuel blends the crystals which form are sufficiently large and dense so that an immobile layer of crystals is formed at the bottom of storage tanks. Such crystals of solid wax are not susceptible to treatment by most pour-point depressants tailored for distillate fuels and the crystals can therefore cause severe flow problems. The flow problems arise when it is attempted to pump the fuel from one location to another. Pump parts, filters, and the like tend to become clogged with the crystals of solid wax which concentrate in the fuel oil at the bottom of storage tanks. The polymers of the present invention, when used as pour-point depressants, serve to improve the pumpability of a distillate fuel oil, normally tending to produce wax crystals of sufficient size and density (formed even in the presence of conventional pour-point depressant to inhibit pumpability, in addition to lowering the pour point.

The polymers of this invention advantageously improve pumpability; for example, a chlorine-containing polyethylene of the above-defined characteristics is very active in modifying the wax crystals formed in or precipitated from troublesome fuels normally tending to form large dense crystals at lower temperatures. Although the formation of the wax is not actually inhibited when using the polymer additive of this invention, the wax appears as a very finely divided fluffy material which should be pumpable under most conditions.

The fuel oil composition of this invention comprises a major amount of a distillate fuel oil and as an improved pour-point depressant, a small but effective amount of the above-defined chlorine-containing ethylene polymer. Usually the chlorine-containing polymer is present in an amount from about 0.001 to about 5 weight percent, advantageously from about 0.001 to about 0.1 weight percent, and preferably from about 0.005 to about 0.03 weight percent. The chlorine-containing polymer may be added directly to the fuel oil or may be formulated in concentrated form in a hydrocarbon solvent such as benzene, toluene, xylene, and the like. Additional suitable solvents are more specifically described herein below.

The fuel oil is a hydrocarbon oil such as, for example, a diesel fuel, a jet fuel, a heavy industrial residual fuel (e.g. Bunker C), a furnace oil, a heater oil fraction, kerosene, a gas oil, or any other like light oil. Of course, any mixtures of distillate oils are also intended. The distillate fuel oil may be virgin and/or cracked petroleum fractions. The distillate fuel oil may advantageously boil in the range of from about 120° to about 400° C. The distillate fuel oil may contain or consist of cracked components such as for example, those derived from cycle oils or cycle oil cuts boiling heavier than gasoline, usually in the range of from about 230° to about 40° C. and may be derived by catalytic or thermal cracking. High-sulfur-containing and low-sulfur-containing oils such as diesel oils and the like may also be used. The distillate oil may, of course, contain other components such as addition agents used to perform particular functions, for example, rust inhibitors, corrosion inhibitors, antioxidants, sludge stabilizing compositions, etc.

The preferred distillate fuel oils have an initial boiling point in the range of from about 120° to about 246° C. and an end point in the range of from about 260° to about 400° C. The distillate fuel oil may advantageously have an A.P.I. gravity of about at least 30 and a flash point (Tag closed cup) not lower than about 43° C. and preferably above about 46° C.

The ester-containing chlorine-containing polymers of this invention may, for convenience, be prepared as concentrates as additives for fuels. Accordingly, the polymer is dissolved in a suitable organic solvent therefor in amounts greater than 10% and preferably from about 10% to about 75%. The solvent in such concentrates may conveniently be present in amounts from about 25% to about 90%. The organic solvent preferably boils within the range of from about 38° C. to about 372° C. The preferred organic solvents are hydrocarbon solvents, for example, petroleum fractions such as naphtha, heater oil, mineral spirits, and the like; aromatic hydrocarbons such as benzene, xylene and toluene; paraffinic hydrocarbons such as hexane, pentane, etc. The solvents selected should, of course, be selected with regard to possible beneficial or adverse effects they may have on the ultimate fuel oil composition.

Cold flow activity is determined according to the procedure of ASTM D 97.

TABLE 1

| Compounds | Oil A | | | | Oil B | | | Oil C | | | Oil D | | |
|---|---|---|---|---|---|---|---|---|---|---|---|---|---|
| ppm | 0 | 300 | 600 | 800 | 0 | 400 | 600 | 0 | −300 | 400 | 0 | 600 | 900 |
| Commercial EVA | −5 | −15 | −40 | −45 | +20 | −10 | −10 | | | | −5 | −25 | −40 |
| *Linear Chlorinated Polyethylene | −5 | −10 | −10 | −10 | +20 | −0 | −5 | +25 | −15 | −15 | −5 | −5 | −10 |
| Example 1 | −5 | −10 | −50 | −50 | | | | | | | | | |
| Example 3 | −5 | −10 | −10 | −50 | +20 | −10 | −20 | +25 | −20 | −40 | | | |
| Example 4 | | | | | | | | | | | −5 | −5 | −25 |

*This linear chlorinated polyethylene was that employed as a starting material in preparing the chloro-esters of Examples 1,3 and 4.

TABLE 2

Cold Filter Plugging Point (CFPP) IP309/80*

| | Oil A | Oil B | Oil C |
|---|---|---|---|
| CFPP Blank °C. | −5 | +5 | +10 |

| Compounds | PPM | | |
|---|---|---|---|
| | 1500 | 1950 | 1750 |
| Commercial EVA-1 | −10 | −1 | +5 |
| Commercial EVA-2 | −11.5 | −3 | −1 |
| Chlorinated Polyethylene | −8 | +2 | +5 |
| Example 5D | −14 | +3 | −5.5 |
| Example 5B | −11.5 | −6 | −8 |

*IP Book of Standards, pp. 309.1-309.6. The CFPP is defined as the highest temperature (expressed as a multiple of 1° C.) at which fuel, when cooled under prescribed conditions, either will not flow through the filter or requires more than 60 seconds for 20 ml. to pass through.

TABLE 3

Low Temperature Flow Test (LTFT)*

| Compound | PPM | |
|---|---|---|
| | Oil A (Cloud - 24.4° C.) | |
| | | LTFT Flow (−27.8° C.) |
| Commercial EVA | 2000 | Fail |
| | 2250 | Fail |
| Chlorinated Polyethylene | 2000 | Fail |
| | 2250 | Fail |
| Example 5C | 2000 | 26 seconds |
| Example 1 | 2250 | 25 seconds |
| Example 5A | 2250 | 33 seconds |
| | Oil B (Cloud - 17.8° C.) | |
| | | LTFT Flow - (−21.1° C.) |

TABLE 3-continued

Low Temperature Flow Test (LTFT)*

| Compound | PPM | |
|---|---|---|
| Commercial EVA | 200 | Fail |
| | 300 | Fail |
| | 400 | 38 seconds |
| Chlorinated Polyethylene | 200 | Fail |
| | 300 | Fail |
| | 400 | Fail |
| Example 5C | 200 | Fail |
| | 300 | 34 seconds |
| | 400 | 30 seconds |

TABLE IV

Low Temperature Flow Test (LTFT)*

| MOLECULAR WEIGHT Polyethylene Linear Branch index Below about 3 | Initial % Chlorine in Polyethylene Based on weight of polyethylene | Moles ACID Reacted | % Chlorine FINAL Polyethylene Based on weight of polyethylene | LTFT TEST | |
|---|---|---|---|---|---|
| | | | | Additive Conc. ppm | RESULTS |
| | | | | | Flow (−17.8° C.) Fuel A. Cloud Pt. (−12.2° C.) |
| (1) 2000 | 24 | Oleic (.5M) | 6.0 | 500 | FAIL |
| | | | | 750 | PASS |
| (2) 2000 | 17 | Oleic (1M) | 0.5 | 500 | PASS |
| (3) 2000 | 24 | Coco (.95M) | 0.8 | 500 | PASS |
| | | | | | Flow (−19° C.) Fuel B. Cloud Pt. (−16° C.) |
| (4) 2000 | 24 | Oleic (.5M) | 6.0 | 2000 | FAIL |
| (5) 2000 | 17 | Oleic (1M) | 0.5 | 2000 | PASS |
| (6) 2000 | 24 | Coco (.95M) | 0.8 | 2000 | PASS |

*Test developed by Exxon Research and Engineering Co. to determine the low temperature operability of diesel fuels in autodiesel equipment. Diesel fuels passing the test are expected to provide satisfactory operability (free of wax plugging) in autodiesel equipment at fuel temperatures equal to or higher than that of the test. Low temperature operability of the test fuel at a given temperature is considered satisfactory if passage of the fuel through a prescribed screen is completed in less than 60 seconds.

The above examples illustrate superior results obtained with linear polyethylene having less than 1% chlorine in chloropolyethylene ester.

The above examples were prepared in the manner of Example 4 where the acids were converted to their sodium salts and then reacted with the chloropolyethylene to form chloroesters by replacement of chlorines from the chlorinated polyethylene.

In summary, this invention relates to halogenated polyalkylenes whose halogens have been wholly or partially replaced by ester groups. The preferred polyalkylene is polyethylene and the preferred embodiment thereof being a linear polyethylene.

The polyethylenes have a molecular weight of from about 1000 to 30,000, such as from about 1500 to 10,000, but preferably from about 1500 to 3000, and a halogen content of from about 1 to 40, such as from about 5 to 30, but preferably from about 10 to 25.

The percent of halogens replaced with ester groups can vary from about 1 to 100, such as from about 10 to 80, but preferably from about 15 to 75.

The invention also relates to the use of the above compositions as pour depressants or cold flow improvers.

The amount of pour depressant employed based on weight of fuel is from about 1 to 2000 ppm, such as from about 10 to 1800 ppm, for example from about 50 to 1800 ppm, but preferably about 100 to 1500 ppm.

This invention also relates to polyalkylenes having halogen and ester groups of low halogen content which are unexpectedly effective as cold flow improvers. For example, we have discovered that polyalkylenes having halogens and ester groups such as those having halogen content of less than about 1% based on weight of polyalkylene, such as from traces of halogen to about 1%, such as about 0.001 to about 1% or from 0.1 to about 0.9%, for example a halogen content of 0.5±0.3%. These unexpected properties are best illustrated in the case of polyethylenes having chlorine and ester groups, particularly where the polyethylene is linear, preferably a branch index of under about 5 but preferably under about 3.

We claim:

1. A fuel oil containing a linear halogenated polyalkylene characterized as
   (a) being essentially free of cross-linking;
   (b) having vinyl unsaturation in the polyalkylene backbone; and
   (c) having 0.001 to less than 1 percent of the halogen groups replaced by ester groups.

* * * * *